United States Patent
Fernberg

[15] 3,653,096
[45] Apr. 4, 1972

[54] FASTENERS

[72] Inventor: Paul Carl Roger Fernberg, Farnham Common, England

[73] Assignee: ITW Limited, Cippenham, Slough, England

[22] Filed: Sept. 8, 1970

[21] Appl. No.: 70,275

[30] Foreign Application Priority Data

Sept. 16, 1969 Great Britain......................45,666/69

[52] U.S. Cl..........................................24/16 PB, 248/74 PB
[51] Int. Cl.................................................B65d 63/00
[58] Field of Search..........................24/16 PB, 73 SA, 73 PB; 248/68, 71, 74 PB

[56] References Cited

UNITED STATES PATENTS

| | | | |
|---|---|---|---|
| 3,049,771 | 8/1962 | Litwin et al. | 248/74 PB |
| 3,302,913 | 2/1967 | Collyer et al. | 248/74 PB |
| 3,486,201 | 12/1969 | Bourne | 24/16 PB |
| 3,542,321 | 11/1970 | Kahabka | 248/74 PB |

FOREIGN PATENTS OR APPLICATIONS 1,159,702 12/1963 Germany..................................248/71

Primary Examiner—Bobby R. Gay
Assistant Examiner—Darrell Marquette
Attorney—Robert W. Beart, Michael Kovac and Jack R. Halvorsen

[57] ABSTRACT

An improvement to the fastener of the type which has a strip with flexible ratchet teeth projecting from its face over a portion of the length of the strip, the strip being passable through a slot from which the teeth then prevent withdrawal, the improvement being in the provision of a release member adjacent to the slot, which member can be manually resiliently depressed so that as the strip is pulled back, a cam face on the member successively depresses the teeth and permits them to pass back into the slot. The entire fastener can be integrally molded in plastics material.

12 Claims, 4 Drawing Figures

PATENTED APR 4 1972 3,653,096

Inventor
*Paul Carl Roger Fernberg*

By
Attorney

FASTENERS

This invention relates to fasteners of a type comprising a strip which has transverse ratchet teeth projecting above its face along a portion of the length thereof, and a slot-defining member; a free end of the strip being passable through the slot, and the teeth being deflected towards the strip during this movement by the pressure of a cam face of the slot on gently sloping surfaces of the teeth, withdrawal of the strip being prevented by an abutting surface at the other end of the slot engaging a steeply sloping surface of one of the teeth. Such fasteners can operate as ties, or straps, to embrace and hold articles such as bundles of electrical conductors, or trees and their supporting stakes, the sizes of which are uncertain and may change. The strip is passed around the articles, through the slot, and is pulled tight, and the ratchet teeth secure the strip against withdrawal.

It is obviously most convenient if the slot member is integral with the strip, being attached thereto remote from the free end, but this is not essential to the present invention.

In the known fasteners of this type, the strip usually has to be released from the slot by such techniques as inserting a blade between the teeth and the abutting surface of the slot to permit the teeth to pass back through the slot. This is often almost impossible because of the confined location of the slot.

According to this invention, a fastener of the type described has a release member adjacent to its abutting surface, which member can be resiliently depressed for a cam face on it to extend beyond the abutting surface of the slot, and so successively depress the teeth, to enable them to pass back into the slot as the strip is pulled back through the slot.

Preferably the entire fastener, with strip, slot member and release member, is a one-piece molding of plastics material.

One fastener constructed in accordance with this invention is described below with reference to the accompanying drawing, in which.

Figure 1:
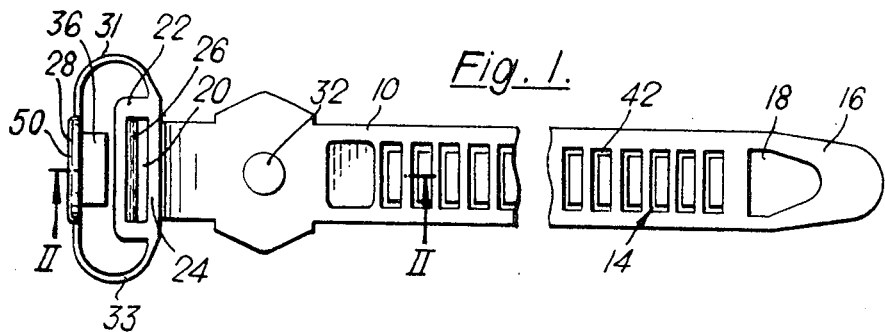
FIG. 1 is a plan view of the two remote ends of a fastener.

The fastener comprises a strip 10 having a face 12 beyond which numerous ratchet teeth 14 project. One remote end of the strip 10 has a rounded-off end portion 16 having an aperture 18. At the other end of the strip 10 is a slot 20, the size of which is substantially equal to the cross-sectional form of the strip 10 as viewed along its axis. The slot 20 is defined by a bridge 22 overlying a bent end portion 24 of the strip. The bent portion 24 lies at a right angle to the general body of the strip which has the ratchet teeth 14, and the bridge 22 presents a cam face 26, for purposes described below. Between the bent down portion 24 and the ratchet teeth is an anchoring fastener. This particular one is a plastic rivet fastener comprising legs 30 which have a bore between them. A rivet 32 is coaxially aligned with the bore, and is attached to the fastener by webs, not shown, so that the pin can be hammered down into the bore when the legs are located in an aperture, and so fasten the strip to an apertured member (not shown). The rivet fastener is no part of the present invention, and any other suitable fastener could be used.

Each tooth 14 as moulded is surrounded in plan view (FIG. 1) by a C-shaped space 42, and has the form of an obliquely projecting cantilever (FIG. 2) having a space 44 beneath it. By this arrangement each tooth can be depressed into the space 44 so that it does not project upwards beyond the plane of the surface 12. Each tooth has a gently sloping face 46 and a steeply sloping face 48.

At the very remote end of the bent down portion 24 and adjacent to the bridge 22, is a release member 28 which also has the form of a bridge, but has integral and flexible "springs" 31 and 33 by means of which the release member can be resiliently pressed towards the portion 24. During that movement a face 36 of the release member, slides over a face 38 of the bridge 22. The release member 28 presents a cam face 40 across part of its width, as seen best in FIG. 3, and has a button 50 at the centre of the bridge.

The entire fastener described can be integrally moulded in one piece in a resilient plastics material, for example, Nylon 66.

In use, the legs 30 of the rivet fastener are passed through an aperture in a member not shown, and the pin 32 is pushed home between the legs 30 to secure the fastener to the member.

The remote end 16 is then bent round to embrace the articles which are required to be fastened together. The end 16 is passed into the slot 20 seen in broken line in FIG. 2.

As the strip is passed through the slot 20, the inwardly tapering surface 26 rides over each of the gently sloping faces 46 of the ratchet teeth, so depressing the teeth below the plane 12 as they pass through the slot. Pulling of the strip 10 through the slot 20 is assisted by the aperture 18 into which a hook can be inserted. As each tooth reaches the other side of the slot, it flexes back outwards, and attempted withdrawal of the strip from the slot causes the steep face 48 of the nearest tooth to engage the abutting surface 38 of the bridge 22. That abutting engagement cannot cause the tooth to be depressed into the space 44 because the slope of the face 48 is too great, and the tooth is thereby prevented from passing into the slot 20. The strip is thereby fastened in the slot and the fastened members are gripped in the closed loop seen in broken line in FIG. 2.

Figures 2, 4:
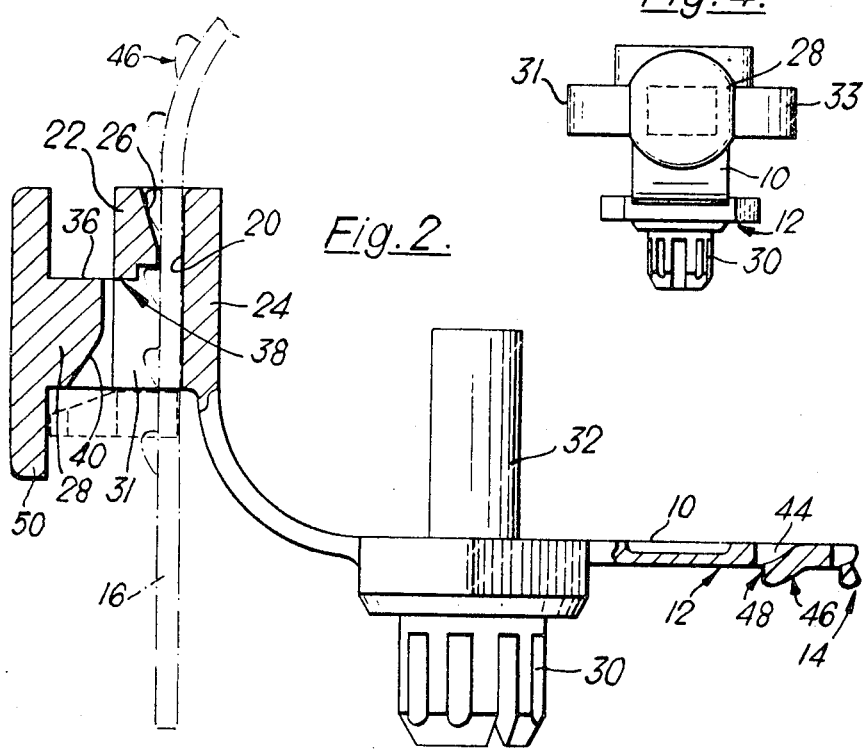
FIG. 2 is a partly sectioned elevation to a larger scale than the other Figures, the section being taken as indicated by the arrows II—II seen in FIG. 1, and also showing in broken line how the remote part of the strip having the ratchet teeth passes through the slot and the release member.
FIG. 4 is an end view.

FIG. 2 shows a minor refinement which has been found useful when the fastener is moulded out of a weak plastic. The corner of the surface 38 which the tooth abuts, has a small step cut out of it, and the step closely confines the tooth, as shown. Pulling on the strip might cause the tooth to bend to the left, as viewed, out of the strip, if its material is weak. The step prevents this happening.

When it is required to purposely release the strip from the slot 20, the release member 28 is manually depressed towards the strip by pressing on the button 50 so that its face 36 slides over the face 38 of the bridge 22, and the corner between the face 36 and the cam face 40 depresses inwards the tooth which is abutting the face 38, until the strip can pass back through the slot 20. Whilst the bridge 28 is held in that position, pulling of the strip to withdraw it causes each successive tooth to be depressed into its underlying space 44, as the tooth rides over the cam face 40, and in its depressed condition each tooth can pass back into the slot 20. The release member 28 is held there for as long as the strip is required to be withdrawn, which can be either until it is partially or completely released.

Figure 3:
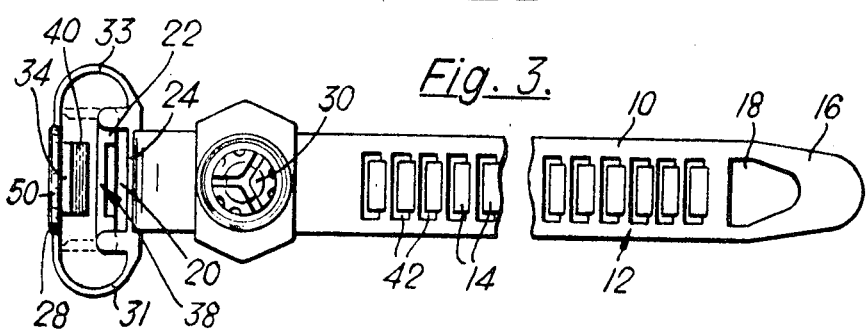
FIG. 3 is an underneath plan view of FIG. 1.

To ensure that the surfaces 36 and 38 do pass over one another during pressure on the button 50, guides seen in broken lines in FIGS. 2 and 3, could be formed as part of the release member.

It is not necessary for this invention that the entire fastener should be integral; the slot and the release member could be presented by a component separate from the strip 10.

I claim:

1. A one-piece plastic fastener for maintaining a bundle of elongated articles in substantially aligned relation including a strip having a plurality of resilient flexible ratchet teeth projecting from its face over a portion of the length of said strip, retention means integral with said strip including a slot, said strip being passable through said slot from one side of said retention means, fixed abutment means on said retention means for engaging said teeth, a release member movably positioned adjacent said slot, said member including means for depressing said flexible teeth into the confines of said strip whereby said teeth are prevented from engaging said abutment means and said strip may be reversely moved to release said elongated articles.

2. A fastener according to claim 1 in which the release member has the form of a bridge.

3. A fastener according to claim 2 in which the bridge has integral springs at its ends.

4. A fastener according to claim 1 in which the release member has a cam face which rides over successive teeth as the strip is pulled back through the slot, and depresses them.

5. A fastener according to claim 1 in which the slot defining member is a bridge lying above a prolongation of the strip.

6. A fastener according to claim 5 in which the prolongation lies at a substantial angle to the toothed part of the strip.

7. A fastener according to claim 1 in which there is an anchoring fastener on the strip.

8. A fastener according to claim 7 in which the anchoring fastener is a rivet type.

9. A fastener according to claim 7 in which the anchoring fastener lies between the ratchet teeth and the slot.

10. A fastener according to claim 1 in which there is a button on the releaSe member, which facilitates its depression.

11. A fastener of the type claimed in claim 10 wherein said retention means includes guide means engageable with said release member to ensure positive location of said release member relative to said abutment means and engaging ratchet teeth.

12. A fastener of the type claimed in claim 1 wherein said flexible ratchet teeth are connected to said strip solely along one edge of said teeth, said strip being spaced from the other edges of said teeth to thereby provide a cavity capable of substantially totally accepting said teeth when in their depressed condition.

* * * * *